M. UNGER.
ELECTRICAL SYSTEM OF POWER TRANSMISSION.
APPLICATION FILED JUNE 14, 1920.
1,373,923. Patented Apr. 5, 1921.
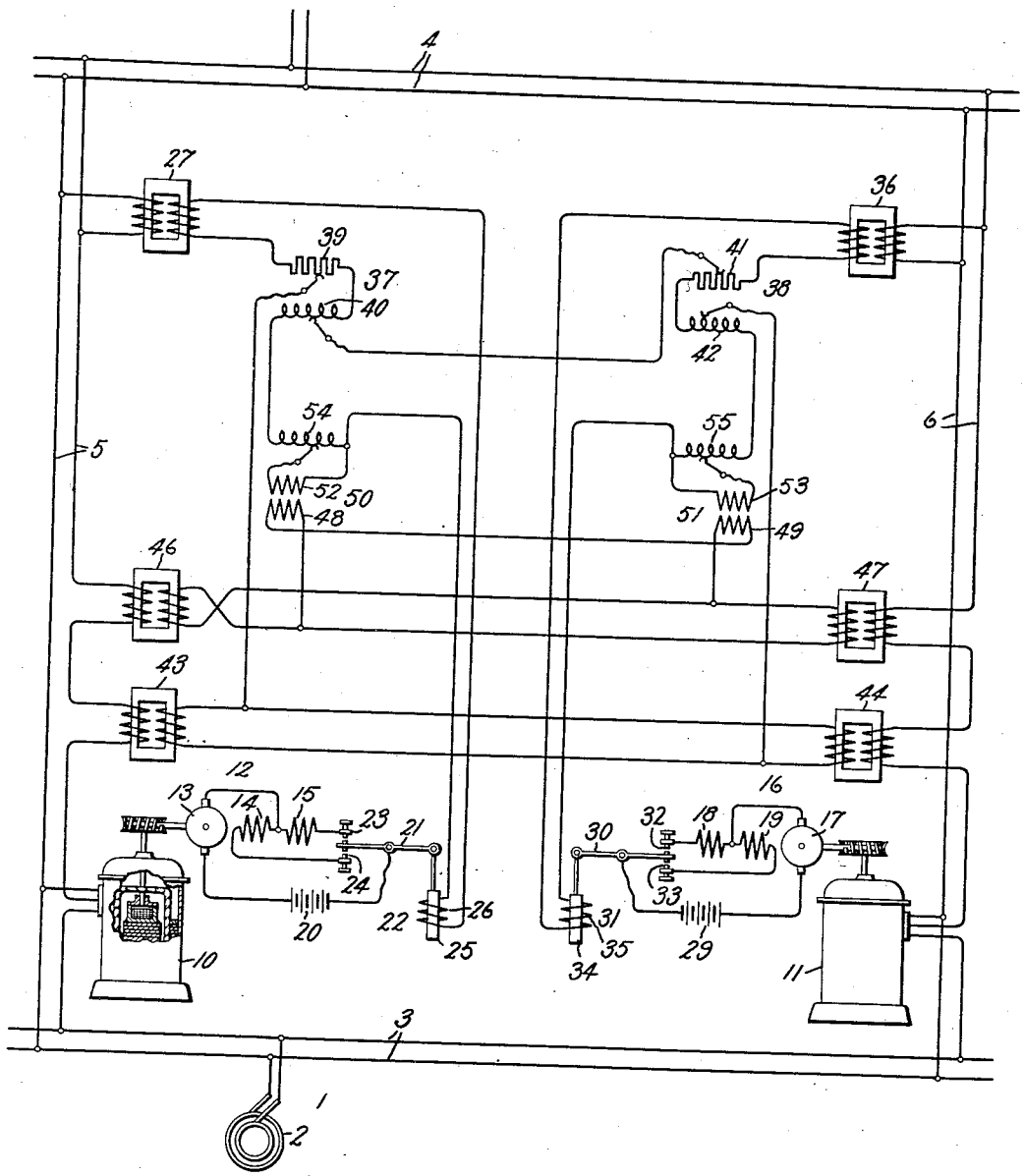
Inventor:
Magnus Unger,
by Albert G. Davis
His Attorney.

UNITED STATES PATENT OFFICE.

MAGNUS UNGER, OF PITTSFIELD, MASSACHUSETTS, ASSIGNOR TO GENERAL ELECTRIC COMPANY, A CORPORATION OF NEW YORK.

ELECTRICAL SYSTEM OF POWER TRANSMISSION.

1,373,923.      Specification of Letters Patent.      Patented Apr. 5, 1921.

Application filed June 14, 1920. Serial No. 388,732.

*To all whom it may concern:*

Be it known that I, MAGNUS UNGER, a citizen of the United States, residing at Pittsfield, county of Berkshire, State of Massachusetts, have invented certain new and useful Improvements in Electrical Systems of Power Transmission, of which the following is a specification.

My invention relates to systems of power transmissions and particularly to electrical systems of power transmission comprising a distribution circuit, a source of alternating current and a plurality of feeder circuits connected between said source and said distribution circuit.

In systems of the kind referred to, it is desirable to maintain the voltage of the distribution circuit constant at some predetermined point on the distribution circuit irrespective of the loads connected thereto and to obtain this result it has been the usual practice to provide a voltage modifying means, such as an induction regulator or a similar device in each feeder circuit to compensate for the voltage drop therein.

Heretofore the only way it was considered possible to automatically regulate the voltage modifying means so as to prevent a circulating current from flowing between the feeder circuits was to mechanically connect the modifying means together so that they were regulated simultaneously. This is an objectionable limitation as sometimes it is very inconvenient to have to install the voltage modifying means so that they can be mechanically connected together. Therefore, it is very desirable to have an arrangement whereby the modifying means may be automatically controlled without mechanically connecting them together.

One object of my invention is to provide in a transmission system of the kind referred to new and improved means for automatically controlling the regulation of the voltage modifying means, whereby it is not necessary to mechanically connect the modifying means together.

In accordance with one feature of my invention, I provide means which are responsive to the circulating current flowing between the feeder circuits for maintaining the amount of circulating current flowing between the feeder circuits substantially zero.

My invention will be better understood from the following description taken in connection with the accompanying drawing and its scope will be pointed out in the appended claims.

Referring to the drawing, which diagrammatically shows one embodiment of my invention as applied to a single phase system of power transmission, 1 represents a source of single phase alternating current comprising an alternator 2 and supply mains 3. 4 denotes a distribution circuit which is adapted to be connected to the source 1 by means of a plurality of feeder circuits. 5 and 6 denote two such feeder circuits.

In order to maintain the voltage at some predetermined point on the distribution circuit 4 constant irrespective of the amount of current flowing through the feeder circuit 5, I provide, in connection with the feeder circuit 5, voltage modifying means of any suitable type whereby the voltage of the source 1 may be bucked or boosted as desired. One such means is diagrammatically shown in the drawing and comprises an induction regulator 10 of any well-known type. In order to maintain the same voltage at the same point on the distribution circuit 4 irrespective of the amount of current flowing through the feeder circuit 6, I also connect an induction regulator 11 in the feeder circuit 6.

While the regulators 10 and 11 may be actuated by any desirable mechanism, I prefer, however, to have each regulator actuated by an electric motor. I have shown the regulator 10 as being actuated by a reversible motor 12 which is provided with an armature 13 and field windings 14 and 15 and the regulator 11 as being actuated by a reversible motor 16 having an armature 17 and field windings 18 and 19. One brush of the motor 12 is electrically connected in series with a source of current 20 to a movable lever 21 of a contact-making voltmeter 22. The other brush of the motor 12 is electrically connected to one terminal of each of the windings 14 and 15, the other terminals of the windings 14 and 15 being connected to the stationary contacts 23 and 24 respectively. These stationary contacts are adapted to be engaged by the movable lever 21 which is actuated by a core 25 and an operating winding 26. The operating winding 26 is connected to the secondary winding of a potential transformer 27, the primary winding of which is connected across the feeder circuit 5.

It will be apparent that as long as the voltage at the point on the feeder circuit 5 where the primary winding of the transformer 27 is connected thereto remains at a predetermined value, voltmeter 22 will occupy the position shown in the drawing. If the voltage at this point tends to vary from this predetermined value, the movable lever 21 will engage either the stationary contact 23 or the stationary contact 24 depending upon whether the voltage tends to decrease or increase. The engagement of the movable lever 21 with the stationary contact 23 completes the circuit of the armature 13 and the field winding 15 of the motor 12, whereupon the regulator 10 is adjusted in a direction to increase the voltage impressed upon the feeder circuit 5, whereas, if the movable lever 21 engages the stationary contact 24, the circuit through the armature 13 and the field winding 14 of the motor 12 is completed whereupon the regulator 10 is adjusted in a direction to decrease the voltage impressed upon the feeder circuit 5.

One of the brushes of the motor 16 is electrically connected in series with a source of current 29 to the movable lever 30 of a contact-making voltmeter 31. The other brush of the motor 16 is connected to one terminal of each of the windings 18 and 19 the other terminals of the windings 18 and 19 being connected to the stationary contacts 32 and 33 respectively. These stationary contacts are adapted to be engaged by the movable lever 30 which is actuated by the core 34 and the operating winding 35. The operating winding 35 is connected to the secondary winding of a potential transformer 36, the primary winding of which is connected across the feeder circuit 6.

It will be apparent that as long as the voltage at the point on the feeder circuit 6, where the primary winding of the transformer 36 is connected thereto, remains at a predetermined value, the contact-making voltmeter 31 will occupy the position shown in the drawing. When, however, the voltage at this point tends to vary from the predetermined value, the movable lever 30 will engage either the stationary contact 32 or the stationary contact 33 depending upon whether the voltage tends to decrease or increase. The engagement of the movable contact 30 with the stationary contact 32 completes the circuit through the armature 17 and the field winding 18 of the motor 16 to move the regulator 11 in a direction to increase the voltage impressed upon the feeder circuit 6, whereas the engagement of the movable contact 30 with the stationary contact 33 completes the circuit through the armature 17 and the field winding 19 of the motor 16, whereupon the regulator 11 is adjusted in a direction to decrease the voltage impressed upon the feeder circuit 6.

In order that the regulators 10 and 11 may be automatically adjusted in accordance with the voltage at some predetermined point on the distribution circuit 4, I provide the line drop compensators 37 and 38 in the circuits of the operating windings 26 and 35 respectively. The line drop compensator 37 comprises a resistance 39 and a reactance 40 and the line drop compensator 38 comprises a resistance 41 and a reactance 42. Portions of the resistance 39 and 41 and of the reactances 40 and 42 are connected in series in a circuit which is energized by the secondary windings of the series transformers 43 and 44, the primary windings of which are connected in series with corresponding leads of the feeder circuits 5 and 6 respectively. The secondary windings of the transformers 43 and 44 are connected in multiple with each other and are so designed and adjusted that the voltages induced therein are equal when the division of the load current between the feeder circuits is such as to produce equal impedance drops therein. Therefore, it will be apparent that with the line drop compensators 37 and 38 set so that, as the secondary voltages of the transformers 43 and 44 vary due to a change in the load connected to the distribution circuit 4, the impedance drops in the line drop compensators vary directly with the impedance drops between the points where the primary windings of the potential transformers 27 and 36 are connected to the feeder circuits 5 and 6 and the point on the distribution circuit 4 where the voltage is to be maintained constant, the voltages impressed upon the operating windings 26 and 35 of the contact-making voltmeters 22 and 31 will be so modified that the regulators 10 and 11 will be adjusted to maintain a constant voltage at the predetermined point on the distribution circuit. With the secondary windings of the transformers 43 and 44 connected in the manner shown, I find that the regulators are not adjusted to compensate for the line drops in the feeder circuits produced by the circulating current flowing between the feeder circuits.

In order to adjust the regulators 10 and 11 so as to maintain the circulating current substantially zero, I provide the series transformers 46 and 47. The primary windings of the transformer 46 and 47 are connected in corresponding leads of the feeder circuits 5 and 6 respectively and the secondary windings of the transformers are cross-connected. The transformers 46 and 47 are so designed that the secondary voltages thereof are equal and balance each other when the division of the load current between the feeder circuits 5 and 6 is such that the impedance drops therein are equal. In a circuit connected to the terminals of the secondary windings of the transformer 46 and 47 I connect the primary windings 48 and 49 of the transformers 50 and 51 respectively. The secondary winding 52 of the transformer 50 is connected to taps on a reactance 54 which is connected in the circuit of the operating winding 26 of the contact-making voltmeter 22. The secondary winding 53 of the transformer 51 is connected to taps on a reactance 55 which is connected in the circuit of the operating winding 35 of the contact-making voltmeter 31. It will be evident that when a circulating current flows between the feeder circuits 5 and 6 due to an excessive voltage being impressed on one of the feeder circuits by the regulator connected therein, the difference in the secondary voltages of the series transformers 46 and 47 causes a current to flow through the primary windings 48 and 49 of the transformers 50 and 51 whereupon a voltage drop will be produced in the reactances 54 and 55. Since the circulating current is displaced 90° from the voltage of the source 1 and the secondary voltages of the transformers 27 and 36, and the voltage drops across the reactances 54 and 55 due to the circulating current are displaced 90° from the circulating current, the voltage drops across the reactances due to the circulating current are in line with the secondary voltages of the transformers 27 and 36. The primary windings 48 and 49 of the transformers 50 and 51 are oppositely connected with respect to each other so that the voltage drop across the reactance 52 increases the voltage impressed upon the operating winding 26 of the contact-making voltmeter 25 and the voltage drop across the reactance 55 decreases the voltage impressed upon the operating winding 35 of the contact-making voltmeter 31 when the regulator 10 is the one which is producing the excessive voltage, whereas the voltage drop across the reactance 54 decreases the voltage impressed upon the operating winding 26 of the contact-making voltmeter 25 and the voltage drop across the reactance 55 increases the voltage impressed upon the operating winding 35 of the contact-making voltmeter 31 when the regulator 11 is the one which is producing the excessive voltage. Therefore, it will be evident that if the regulator 10 is the one producing the excessive voltage it will be adjusted in a direction to decrease the voltage impressed upon the feeder circuit 5 and the regulator 11 will be adjusted in a direction to increase the voltage impressed upon the feeder circuit 6, until the circulating current becomes substantially zero, whereas, if the regulator 11 is the one producing the excessive voltage it will be adjusted in a direction to decrease the voltage impressed upon the feeder circuit 6 and the regulator 10 will be adjusted in a direction to increase the voltage impressed upon the feeder circuit 5 until the circulating current becomes substantially zero.

It will be evident that I have provided an arrangement whereby the voltages impressed upon the contact-making voltmeters of the regulators are so modified, in response to the flow of a circulating current through the feeder circuits, that the regulators are adjusted relative to each other so as to decrease the amount of circulating current to substantially zero.

While I have shown only one embodiment of my invention various modifications thereof may be made and, therefore, I do not desire to be limited to the particular arrangement herein described and shown, but seek to cover in the appended claims all such modifications which do not depart from the spirit and scope of my invention.

What I claim as new and desire to secure by Letters Patent of the United States, is,—

1. In an electrical system, a distribution circuit, a source of alternating current, a plurality of feeder circuits connecting said distribution circuit and said source, a voltage modifying means interposed in each one of said feeder circuits, and means responsive to a circulating current flowing between said feeder circuits for automatically regulating said voltage modifying means.

2. In an electrical system, a distribution circuit, a source of alternating current, a plurality of feeder circuits connecting said distribution circuit and said source, a voltage modifying means interposed in each one of said feeder circuits, means adapted to automatically regulate said voltage modifying means to maintain a constant voltage at a predetermined point on said distribution circuit, and means adapted to modify the operation of said regulating means to maintain the circulating current flowing between said feeder circuits substantially zero.

3. In an electrical system, a distribution circuit, a source of alternating current, a plurality of feeder circuits connecting said distribution circuit and said source, a voltage modifying means interposed in each one of said feeder circuits, means associated with each voltage modifying means for adjusting the same, a voltage responsive device associated with each adjusting means and adapted to control the operation thereof, and means responsive to a circulating current flowing between said feeder circuits for modifying the operation of said voltage responsive device.

4. In an electrical system, a distribution circuit, a source of alternating current, a plurality of feeder circuits connecting said distribution circuit and said source, a voltage modifying means interposed in each one of said feeder circuits, means associated with each voltage modifying means for adjusting the same, means associated with each adjusting means and adapted to control the operation thereof in accordance with variations in the voltage at a predetermined point on said distribution circuit, and means responsive to a circulating current flowing between said feeder circuits adapted to modify the operation of said controlling means.

5. In an electrical system, a distribution circuit, a source of alternating current, a plurality of feeder circuits connecting said distribution circuit and said source, a voltage modifying means interposed in each one of said feeder circuits, means associated with each voltage modifying means for adjusting the same, a contact-making volt-meter associated with each adjusting means and controlling the operation thereof, means for impressing upon the windings of said voltmeters voltages which vary in accordance with the variations in the voltage at a predetermined point on said distribution circuit, and means responsive to a circulating current flowing between said feeder circuits for producing voltage drops in the circuits of the windings of said volt-meters to modify the operation of said voltmeter so that modifying means are adjusted to decrease the amount of circulating current flowing in said feeder circuit to substantially zero.

6. In an electrical system, a distribution circuit, a source of alternating current, a plurality of feeder circuits connecting between said distribution circuit and said source, a voltage modifying means interposed in each one of said feeder circuits, means associated with each voltage modifying means for adjusting the same, a contact-making volt-meter associated with each adjusting means and controlling the operation thereof, means for impressing upon the windings of said voltmeters voltages which vary in accordance with the variations in the voltage at a predetermined point on said distribution circuit, a reactance in the circuit of the operating winding of each one of said voltmeters and means responsive to a circulating current flowing between said feeder circuits for producing voltage drops across said reactances to modify the voltages impressed upon the windings of said voltmeters.

7. In an electrical system, a distribution circuit, a source of alternating current, two feeder circuits connecting said distribution circuit and said source, a voltage modifying means interposed in each of said feeder circuits, means associated with each voltage modifying means for adjusting the same, a contact-making voltmeter associated with each adjusting means and controlling the operation thereof, means for impressing upon the operating windings of said voltmeter voltages which vary in accordance with the variations in the voltage at a predetermined point on said distribution circuit, a reactance in the circuit of the operating winding of each one of said voltmeters, a transformer associated with each reactance and having its secondary winding connected to taps on the reactance with which it is associated, and a series transformer associated with each feeder circuit, said series transformers having their primary windings connected in corresponding leads of the respective feeder circuits and their secondary windings cross-connected and in a circuit including the primary windings of said first mentioned transformers which are oppositely connected with respect to each other in said circuit.

In witness whereof, I have hereunto set my hand this eleventh day of June, 1920.

MAGNUS UNGER.